(12) United States Patent
Buchter

(10) Patent No.: US 12,199,399 B2
(45) Date of Patent: Jan. 14, 2025

(54) LASER DEVICE FOR LASER DETECTION AND RANGING (LiDAR)

(71) Applicant: IRIDESENSE, Issy-les-Moulineaux (FR)

(72) Inventor: Scott Buchter, Espoo (FI)

(73) Assignee: IRIDESENSE, Issy-les-Moulineaux (FR)

( * ) Notice: Subject to any disclaimer, the term of this patent is extended or adjusted under 35 U.S.C. 154(b) by 960 days.

(21) Appl. No.: 17/278,571

(22) PCT Filed: Mar. 19, 2019

(86) PCT No.: PCT/EP2019/056840
§ 371 (c)(1),
(2) Date: Mar. 22, 2021

(87) PCT Pub. No.: WO2020/064150
PCT Pub. Date: Apr. 2, 2020

(65) Prior Publication Data
US 2021/0351560 A1    Nov. 11, 2021

Related U.S. Application Data

(60) Provisional application No. 62/737,128, filed on Sep. 27, 2018.

(51) Int. Cl.
*H01S 3/23*    (2006.01)
*G01S 7/484*   (2006.01)
(Continued)

(52) U.S. Cl.
CPC ............ *H01S 3/2308* (2013.01); *G01S 7/484* (2013.01); *G01S 17/10* (2013.01); *H01S 3/025* (2013.01);
(Continued)

(58) Field of Classification Search
None
See application file for complete search history.

(56) References Cited

U.S. PATENT DOCUMENTS 6,347,099 B1 *  2/2002  da Silva ................. H01S 3/067
                                                   372/6
6,512,630 B1 *  1/2003  Zayhowski ........... H01S 3/0627
                                                   372/71
(Continued)

FOREIGN PATENT DOCUMENTS

WO        2005046064 A1     5/2005

OTHER PUBLICATIONS

International Search Report and Written Opinion issued in PCT/EP2019/056840; dated May 29, 2019, 8 pages provided.

*Primary Examiner* — Eric L Bolda
(74) *Attorney, Agent, or Firm* — Alumen IP Law PC

(57) ABSTRACT

A laser device for laser detection and ranging (LiDAR), comprising:
  a laser oscillator configured for emitting a pulsed laser beam,
  a laser beam amplifier disposed on the laser beam path,
  a pumping unit disposed between the laser oscillator and the laser beam amplifier and configured to, when receiving an incoming continuous pumping beam having the pumping wavelength,
  transmit the laser beam along the laser direction;
  send the pumping beam for pumping the laser oscillator in the opposite direction to the laser direction, and
  transmit a reflected part of the pumping beam for pumping the laser beam amplifier, in the laser direction.

20 Claims, 2 Drawing Sheets

(51) Int. Cl.
*G01S 17/10* (2020.01)
*H01S 3/02* (2006.01)
*H01S 3/094* (2006.01)
*H01S 3/0941* (2006.01)
*H01S 3/1115* (2023.01)
*H01S 3/1118* (2023.01)
*H01S 3/16* (2006.01)

(52) U.S. Cl.
CPC ...... *H01S 3/094061* (2013.01); *H01S 3/0941* (2013.01); *H01S 3/1115* (2013.01); *H01S 3/1671* (2013.01); *H01S 3/1118* (2013.01)

(56) References Cited

U.S. PATENT DOCUMENTS

| | | |
|---|---|---|
| 2004/0012841 A1 | 1/2004 | McCarthy |
| 2013/0064259 A1 | 3/2013 | Wakabayashi et al. |
| 2016/0294152 A1* | 10/2016 | Bhawalkar ............ H01S 3/2308 |
| 2021/0119401 A1* | 4/2021 | Zaytsev ................ H01S 3/1698 |
| 2022/0052510 A1* | 2/2022 | Zayer ................ H01S 3/094003 |

* cited by examiner

LASER DEVICE FOR LASER DETECTION AND RANGING (LiDAR)

TECHNICAL FIELD

The invention relates to methods and systems for laser-diode-pumped solid-state laser and amplifier and particularly to a laser-diode-pumped laser for laser detection and ranging (LiDAR) application.

BACKGROUND ART

Solid-state-lasers usually comprises a gain medium adapted to amplify light by way of stimulated emission when receiving pumping power, for example electrical or optical pumping power. In order to emit the laser beam, the emitted photon should be further amplified through the gain medium. For this purpose, it is known and used an optical cavity comprising a parallel pair of mirrors on both ends of the gain medium. A photon which is emitted in the direction normal to the mirrors is reflected by each mirror in round trips. Each round trip amplifies the laser until the gain exceeds the losses, then the laser emits the laser beam through the one of the mirrors of the pair which has the lower reflectivity.

For example, in a laser chip, gain medium may namely be formed from a crystal and the mirrors may be reflective-treated interfaces between the crystal and the outside of the laser chip.

For example, optical pumping power may be provided from a pump diode.

Diode-pumped laser may have a number of applications. Some of them require that the laser is very small and compact while being powerful enough for the selected application. For example, it is known from U.S. Pat. No. 6,512,630 a miniature laser which is longitudinally pumped.

Technical Problem

Prior art lasers do not reach the ideal laser optical characteristics for some applications, as for example for mobile three-dimensional LiDAR.

Indeed, such an application requires a laser able to produce short pulse width having an order of magnitude of around 1 ns, with high repetition rate having an order of magnitude of 1 Mhz, having a good beam quality, for example the M2 factor is lower than 2. The M2 factor is a factor which quantifies the deviation of the beam from an ideal Gaussian (M2=1). The laser should further be able to produce pulse energy sufficient for long distance, e.g. over 200 m, and ranging with a moderately sized aperture, e.g. lower than 25 mm. In addition, the laser source should be very compact, suitable for automated manufacturing, and low cost.

The present invention aims at improving this situation.

It is the object of the present invention to provide a laser source able to reach such characteristics

DISCLOSURE OF INVENTION

It is proposed a laser device for laser detection and ranging (LiDAR), comprising:
- a laser oscillator (30) configured for emitting a pulsed laser beam (B4) when optically pumped at a pumping wavelength, the laser oscillator (30) being configured for emitting the laser beam (B4) at a laser wavelength in a laser direction (X1) along a laser beam path,
- a laser beam amplifier (9) disposed on the laser beam path and configured to amplify the laser beam (B4) when the laser beam amplifier (9) is optically pumped at the pumping wavelength,
- a pumping unit (10) disposed between the laser oscillator (30) and the laser beam amplifier (9) and configured to, when receiving an incoming continuous pumping beam having the pumping wavelength,
  transmit the laser beam (B4) along the laser direction;
  send the pumping beam for pumping the laser oscillator (30) in the opposite direction (X2) to the laser direction, and
  transmit a part of the pumping beam which is reflected by the laser oscillator (30) for pumping the laser beam amplifier (9), in the laser direction, such that the laser beam, the pumping beam and the part of the pumping beam which is reflected by the laser oscillator (30) are collinear along the laser beam path.

Therefore, only one pumping source is necessary to operate the laser device.

The wording "direction", for example "laser direction" or "opposite direction", designates an optical path which is not necessarily straight-lined and that may comprise on-path reflections.

In embodiments, such a laser device may comprise one or more of the following features.

Namely, the laser oscillator may comprises:
an oscillator material, and
two opposite parallel reflective surfaces on both sides, the laser oscillator being further configured for emitting the laser beam when the oscillator material is optically pumped at a pumping wavelength, the laser oscillator being configured for emitting the laser beam through one of the reflective surfaces, the laser direction being perpendicular to a normal of the reflective surfaces. For example, the reflective surfaces are planar.

The laser oscillator, laser beam amplifier and pumping unit of the laser device are optically connected in free space.

In embodiments, the oscillator material is a vanadate based host crystal, for example GdVO4 or YVO4 or LuVO4, for example with neodymium (Nd) doping.

In embodiments, the laser wavelength is 1064 nm and the pumping wavelength is 808 nm.

In embodiments, the part of the pumping beam which is reflected is over 50%, preferably over 70%, preferably over 80% of the power of the incoming pumping beam.

The effect of a temperature variation on the reflective surface of the laser oscillator may be a shift of the centroid of the wavelength reflection band of the reflective surface. In order to preserve the reflective properties of the reflective surface for the pumping wavelength, the laser device may further comprise various advantageous features.

For example, the reflective surface of the laser oscillator is configured such that the wavelength reflection band is centered on the pumping wavelength, and half the wavelength reflection band is larger than the maximum shift of the pumping wavelength due to temperature variation of the laser oscillator. For instance, the wavelength reflection band has a larger of 50 nm bandwidth centered at the pumping wavelength. In such a case, a 1 nm shift of the pumping wavelength, due to the temperature variation of the laser oscillator will have no effect on the reflective performance of the reflective surface of the laser oscillator.

Therefore, the reflective property of the reflective surface of the laser oscillator (30) is quite independent of the temperature such that the ratio of the pumping beam which is reflected is independent of the temperature. Same features and consequences may apply to the laser beam amplifier concerning the transmitting properties of input and output surfaces of the laser beam amplifier at the laser wavelength. In other words, the transmitting surface of the laser beam amplifier is configured such that the wavelength transmission band is centered on the laser wavelength, and half the wavelength transmission band is larger than the maximum shift of the laser wavelength due to temperature variation of the laser beam amplifier.

In embodiments, the pumping unit (10) is further configured in order that the pumping beam (B2) which is sent for pumping the laser oscillator (30) is circularly polarized.

In embodiments, the incoming pumping beam (B1) has an incoming direction which is inclined at a predefined angle to the laser direction.

In embodiments, the incoming pumping beam has a first polarization state, wherein the pumping unit is further configured to:
  deviate in the opposite direction (X2) the incoming pumping beam, and
  transmit in the laser direction (X1) part of the pumping beam which is reflected by the laser oscillator with a second polarization state, the first and second polarization states being orthogonal to each other.

One will understand that the opposite direction is the direction of the back path of the laser beam path, which is parallel and opposite to the laser direction.

One will understand the wording "polarization state" as a state of a beam selected between various states qualifying the beam, as for example a linear polarization state, or a circular polarization beam, or an elliptic polarization beam.

In embodiments, the first and second polarization states are linear, the pumping unit comprising:
  a polarizing beamsplitter (7) configured to perform said deviation and transmission of the pumping beams,
  an optical component (62) being disposed on the laser direction between the laser oscillator (30) and the beamsplitter (7) and being configured to, at the pumping wavelength, convert a linear polarization into a circular polarization in the opposite direction (X2) and to convert a perpendicular circular polarization into a perpendicular linear polarization in the laser direction (X1).

In embodiments, the optical component may operate as a quarter waveplate (62) for the pumping wavelength. Besides, the optical component may operate, at the laser wavelength, as a half-waveplate providing a full-wave retardation. Therefore, the laser beam (B4) is only retarded by a period after passing through the optical component (62) and the optical component has no effect on the polarization of the laser beam (B4) which is already linearly polarized.

Preferably, the optical component is a dual wavelength multi-order wave plate. Existing dual wavelength multi-order wave plate is referred WPDM05M-1064H-532Q by the manufacturer THORLABS® for the two wavelengths 532 nm and 1064 nm. Preferably, a dual wavelength multi-order wave plate having the same optical behavior for the optical wavelengths 808 nm and 1064 nm may be used in the laser device.

In embodiments, the predefined angle is 90°.

In embodiments, the beamsplitter (7) is a dielectric polarizing beamsplitter.

Various dielectric polarizing beamsplitter may serve to implement the laser device according to embodiments. For instance, one can use a dielectric film based polarizing beamsplitter, whether plate or cube. Preferably, one can use a dielectric polarizing beamsplitter cube. Such a cube has a transmitting beam extinction ratio over 1000:1 and reflects s-polarization by 90°. P-polarized (from the German parallel) light has an electric field polarized parallel to the plane of incidence, while s-polarized (from the German senkrecht) light is perpendicular to this plane. One can select a cube having a wavelength range of [620 nm-1000 nm] in order to operate both at the pumping wavelength and at the laser wavelength. For instance one can use a cube referred by PBS052 by the manufacturer THORLABS, having 5 mm×5 mm×5 mm dimension.

Alternatively, one can use a Glan-Taylor cube which offers extinction ratios up to 100,000:1. A Glan-Taylor prism is a cube formed from two prisms which are separated by an internal air-gap at the interface between the two prisms. The two prims are formed from a birefringent material such as for example calcite. The optical axes of the prisms are parallel to each other and are in a plane perpendicular to the optical axis of the cube. When receiving light along the optical axis, the Glan-Taylor prism reflects the s-polarized part of the light at the internal air-gap and transmits only the p-polarized part.

In embodiments, the laser oscillator (30) is a solid state laser.

In embodiments, the laser oscillator (30) comprises an oscillator material (3) and a saturable absorber material (4).

In embodiments, the laser oscillator (30) comprises an oscillator material and the laser beam amplifier (9) comprises an amplifier material, the oscillator material and the amplifier material having the same chemical composition. One can understand that the same chemical composition refers to a similar chemical formula, but that the doping ratios may still differ.

In embodiments, the laser device further comprises a single pumping source configured to emit the incoming pumping beam in the pumping unit and disposed in order to emit the incoming pumping beam on the incoming direction.

In embodiments, the pumping source is a pumping diode. Such a pumping diode may have one or more of the following characteristics: a center wavelength equal to 808±3 nm, an output power of 5 W, a spectral full width at half maximum (FWHM) lower or equal to 3 nm, a spectral width at 90% maximum lower or equal to 4 nm, a fast axis divergence (FWHM) around 35 degree and a slow axis divergence (FWHM) around 8 degree, a TE polarization mode and a wavelength temperature coefficient around 0.28 nm/° C. The range of operating temperature is around 15 to 30° C. Such a pumping diode may be referred FL-CM01-5-808 by the manufacturer FOCUSLIGHT®. Alternatively, the use of pumping diodes having a better temperature coefficient is possible rather than a cheaper pumping diode.

Thanks to these characteristics, the laser module is compact and may be integrated into a vehicle.

The invention also provides a use of the laser device for laser detection and ranging (LiDAR) or a laser module according to any above mentioned embodiment, into a vehicle.

The invention also provides a vehicle comprising a laser device for laser detection and ranging (LiDAR) or the laser module according to any above mentioned embodiment, into a vehicle.

The above-mentioned and following features, can be optionally implemented, separately or in combination one with the others:

BRIEF DESCRIPTION OF DRAWINGS

Other features, details and advantages will be shown in the following detailed description and on the figures, on which.

DESCRIPTION OF EMBODIMENTS

Figures and the following detailed description contain, essentially, some exact elements. They can be used to enhance understanding the invention and, also, to define the invention if necessary.

Figure 1:
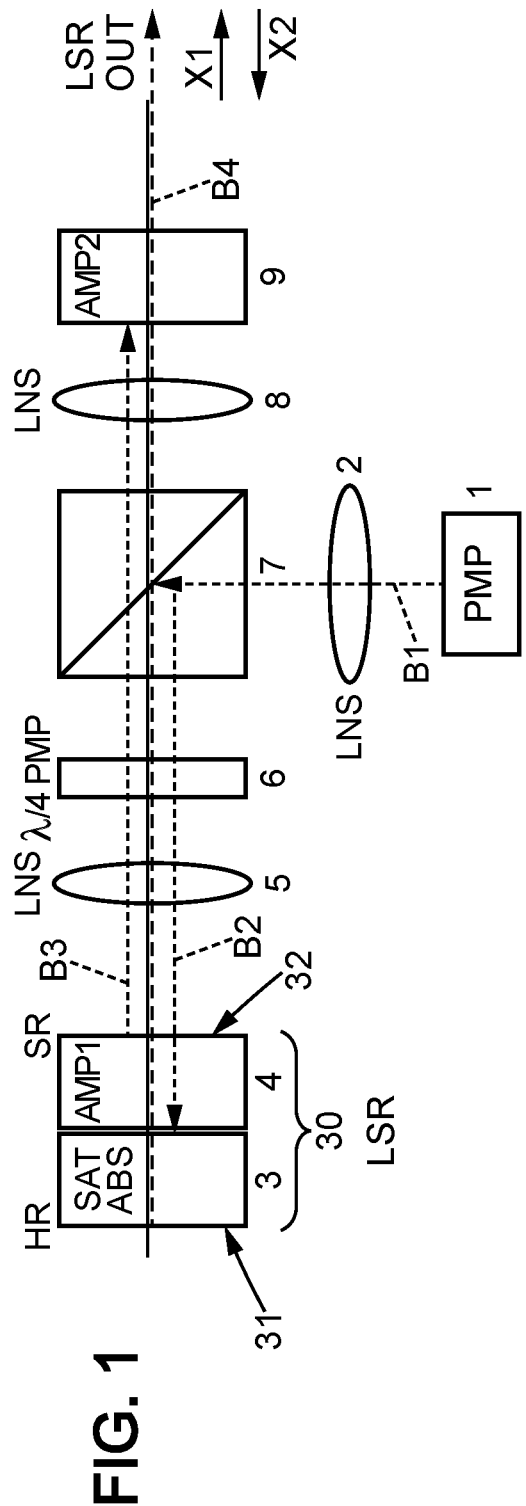
FIG. 1 is a schematic side view of a laser device according to an embodiment of the invention.

As represented on FIG. 1, it is provided a laser device for LiDAR with circularly polarized pumping beam. The laser device comprises:
- a set of elements acting functionally as a laser chip 30 for emitting a laser beam B4 at a laser wavelength
- a set of elements acting functionally as a laser beam amplifier 9;
- a set of elements acting for functionally pump the laser chip 30 as well as the laser beam amplifier 9.

The elements of the laser device are optically connected in free space. In other words, the elements of the laser device are not connected by optical fibers.

Figure 2:
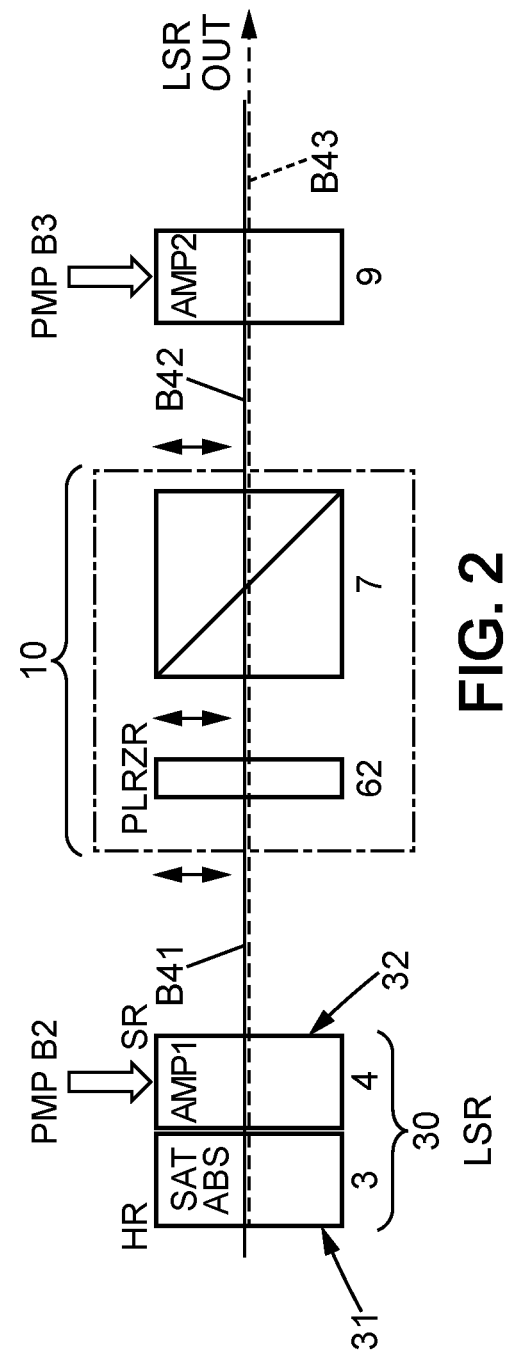
FIG. 2 is a schematic view of the lasing parts of the laser device of [FIG. 1]
Figure 3:
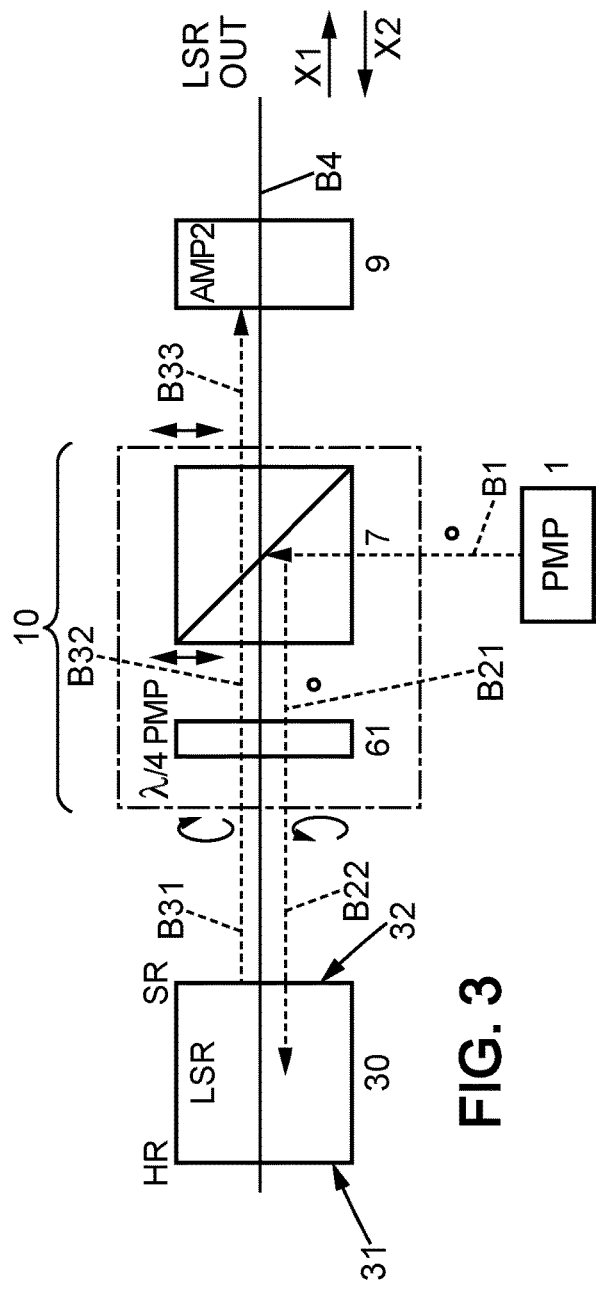
FIG. 3 is a schematic view of the pumping parts of the laser device of [FIG. 1].

For the sake of clarity, the following description of the laser device of FIG. 1 is divided into two sub-parts referring respectively to FIG. 2 and FIG. 3. FIG. 2 describes more specifically the set of elements acting functionally as a laser chip 30 for emitting a laser beam B4 at a laser wavelength and the set of elements acting functionally as a laser beam amplifier 9. FIG. 3 describes more specifically the set of elements acting for functionally pump the laser chip 30 as well as the laser beam amplifier 9. It will be understood that the laser of FIG. 1 comprises all the set of elements acting together.

Laser Chip

The laser chip 30 is described below with reference to FIG. 2. The laser chip 30 is configured to emit a laser beam B4. For the sake of clarity, the laser beam B4 along the laser path is referred to as the laser beam B41 at the output of the laser chip 30, to as the laser beam B42 at the input of the laser amplifier 9, and to as the laser beam B43 at the output of the laser device. The laser direction X1 is the laser path, in the direction of transmission of the laser beam B4.

As pictured on FIG. 2, the laser chip 30 mainly comprises a solid state oscillator material 4, a saturable absorber medium 3, and two reflective elements 31, 32 which define an optical resonator, also referred to as a laser cavity. The elements 31, 3, 4 and 32 are sequentially stacked as described below such as to form together a monolithic body also referred to as "microchip".

The solid state oscillator material 4 causes stimulated emission of photons at the laser wavelength when pumped by an optical pump beam B2.

The saturable absorber medium 3 causes losses until saturation, when it does almost not cause losses anymore. Therefore a brutal increase of the gain of the laser is observed when the loss in the absorber medium becomes brutally negligible.

The reflective element 32 is partially reflective at the laser wavelength (between 75% and 95%) whereas the reflective element 31 is highly reflective (almost 100%). Therefore the laser beam B41 gets out the laser cavity through the reflective element 32.

The solid state oscillator material 4 and the saturable absorber medium 3 are bonded together such as to form the monolithic body. For instance, the bonding is performed by diffusion bonding or by deposition of the saturable absorber on the laser medium by liquid phase epitaxy.

For instance, the materials for the solid state oscillator material 4 is a doped uniaxial crystal, such that the laser beam B4 at the output of the laser is polarized. For instance, the uniaxial crystal may have the chemical formula $AVO_4$ with A selected in the list consisting in Y, Lu and Gd. For instance the doping ions are neodymium, such as $Nd^{3+}$. Preferably, but not limitatively, the materials for the solid state oscillator material 4 is $Nd:YVO_4$ Therefore, in absence of any major additional polarization selective element in the laser cavity, the laser light will be polarized along the vertical crystallographic axis, also referred to as "c-axis", of the crystal. Indeed, the laser gain is much higher along the c-axis than the horizontal crystallographic axis passing from front to back, also referred to as "a-axis", for such materials.

The material for the saturable absorber medium 3 is a semiconductor saturable absorber (SESAM).

The laser cavity between the two reflective elements 31, 32 is of length L=0.5 mm, and the emitted laser wavelength is 1064 nm.

The reflective elements 31 and 32 may be formed by multiple stacks of dielectric and/or semiconductor layers.

Laser Beam Amplifier

As represented on FIG. 2, the laser beam B41 is emitted by the laser chip 30 along the optical axis of the laser chip 30. A laser beam amplifier 9 is disposed on the path of the laser beam B42, along the optical axis of the laser chip 30.

It is possible the laser beam amplifier 9 is composed from the same material, for instance $YVO_4$, as the solid state oscillator material 4. However, the active ion, for instance $Nd^{3+}$, doping level may be different. For instance, the doping level of the laser beam amplifier 9 may be 0.5% whereas the doping level of the solid state oscillator material 4 may be 1%.

The laser beam amplifier 9 causes stimulated emission of photons at the laser wavelength when pumped by an optical pump beam B3. Therefore the laser beam amplifier 9 amplifies the laser beam B42 on its path and transmits an amplified laser beam B43.

Advantageously, the amplified laser beam B43 has a power which is about 10 times the power of the laser beam B42.

FIG. 2 further represents a pumping unit 10 on the path of the laser beam B4. The pumping unit 10 comprises a polarizer 62 and a polarizing beamsplitter 7.

Travelling through the polarizer 62, the laser beam B4 is p-polarized as represented by the arrows. The polarizing beamsplitter 7 does not impact the travel of the p-polarized laser beam B4, as it will be further described below.

Functional Double Pumping

FIG. 3 represents how to functionally achieve to pump both the laser chip 30 and the laser beam amplifier 9 using the same unique polarized laser diode 1.

In general, the pumping unit 10 is configured for receiving a pump beam B1 from the unique linearly polarized laser diode 1. The linearly polarized laser diode 1 is arranged such that its optical axis is perpendicular to the optical axis of the laser chip 30 and that the direction of emission intersects the pumping unit 10, and in particular the polarizing beamsplitter 7. The pumping unit 10 further comprises a quarter wave plate 61 disposed between the laser chip 30 and the beamsplitter 7 along the laser path.

For the sake of clarity, following the pump beam travel on the FIG. 3, the pump beam B2 along the laser path in the opposite direction X2 to the laser direction X1 is referred to as:

the pump beam B21 at the input of the quarter wave plate 61, which originates from the pump beam B1 deviated by the beamsplitter 7, the pump beam B22 at the output of the quarter wave plate 61, which originates from the pump beam B23 having travelled through the quarter wave plate 61.

The pump beam B3 is referred to as:

the pump beam B33, at the input of the quarter wave plate 61, wherein the pump beam B33 originates from a partial reflection of the pump beam B22 on the laser chip 30, as it will be further described below, the pump beam B32 at the output of the quarter wave plate 61, which originates from the pump beam B31 having travelled through the quarter wave plate 61, and the pump beam B33 at the output of the beamsplitter 7, which originates from the pump beam B32 having travelled through the beamsplitter 7.

As previously stated, the respective functions of the pump beams B2 and B3 are respectively pumping the laser chip 30 and the laser beam amplifier 9.

The light travel of the pump beam B1 emitted from the linearly polarized laser diode 1 through each component is explained more in details below. The beam B1 is s-polarized.

The polarizing beamsplitter 7 is configured to reflect a linearly-polarized part of a received light in a different direction than its optical axis, and to transmit the perpendicularly-polarized part of the received light.

In the example of the FIG. 2, the polarizing beamsplitter 7 is a dielectric polarizing beamsplitter cube. The polarizing beamsplitter cube is configured to transmit the p-polarized received light and to steer the s-polarized received light to 90°.

Therefore, receiving the s-polarized beam B1, the polarizing beamsplitter 7 reflects it perpendicularly of the optical axis of the linearly polarized laser diode 1, and parallel to the optical axis of the laser chip 30 and in the opposite direction X2 to the laser direction X1. The resulting beam is referred to as the pump beam B21. At first, the pump beam B21 is s-polarized.

The quarter wave plate 61 is disposed on the optical axis of the laser chip 30 such that its slow and fast axis are arranged at 45° with the s-polarization of the pump beam B21. The slow axis of a retarder is the axis through which the light travels slower, whereas the fast axis of a retarder is the axis through which the light travels faster. In the case of a quarter wave plate, the retardation describes the phase shift (a quarter of the wavelength) between the polarization component projected along the fast axis and the component projected along the slow axis.

The pump beam B22 passes through the quarter wave plate 61 which results in changing the polarization from a s-polarization to a circular polarization, as represented on the FIG. 3.

A first part of the pump beam B22 is reflected by the reflective element 32 and a second part of the pump beam B22 enters the laser chip 30 through the reflective element 32 in order to pump the solid state oscillator material 4. The ratio between the first and the second part is for example lower than 50%, preferably lower than 30%, and even preferably sensibly equal to 20%.

The second part of the beam B22 which is reflected is referred to as pump beam B31. At first, due to the reflexing on the reflective element 32, pump beam B31 is inversely circularly polarized compared to pump beam B22 which arrives on the reflective element 32.

The pump beam B32 goes through the quarter wave-plate 61 in the laser direction X1. The polarization is converted by the quarter wave-plate 61 into a p-polarization.

The pump beam B33 is transmitted through the polarizing beamsplitter 7 without any changes due to the fact that the polarization of the beam B32 is a p-polarization.

The pump beam B33 arrives on the laser beam amplifier 9 and therefore enables to amplify the laser beam B4 by optically pumping the laser amplifier 9.

The quarter wave plate 61 and the polarizer 62 may be a unique optical component 6 acting differently for the laser wavelength and for the pumping wavelength, such as for example a dual wavelength multi-order wave plate.

FIG. 1 further represents a pair of lenses 5 and 8 whose purpose is to collimate the pump beams B22 and B33 respectively on the laser chip 30 and on the laser beam amplifier 9 along the pump beam paths on both side of the beamsplitter 7.

As represented on FIG. 1, the beam B1 further passes through a lens 2 between the linearly laser diode 1 and the beamsplitter 7, in order to be collimated on the beamsplitter 7.

One of the specificities of the laser schematically represented on FIG. 1 is that both the laser chip 30 and the laser beam amplifier 9 are pumped by the same linearly polarized laser diode 1 emitting a pumping beam B1 at a pumping wavelength. For example the pumping wavelength is of 808 nm and the laser beam is of 1064 nm. For instance the power of the pumping beam B1 is split in 20% and 80% by reflecting on the reflective surface 32 of the laser oscillator 4, such that the 20% of the power may pump the laser oscillator 4 whereas the 80% of the power may pump the laser beam amplifier 9.

One of the specificities of the laser schematically represented on FIG. 1 is that the pump beams B2, B3 are collinear to the laser beam B4.

One of the specificities of the laser schematically represented on FIG. 1 is that the polarized laser diode 1 is arranged such that its optical axis is not collinear to the optical axis of the laser chip 30. More specifically, the optical axis of the laser chip 30 and the optical axis of the polarized laser diode 1 are perpendicular to each other.

Figure 4:
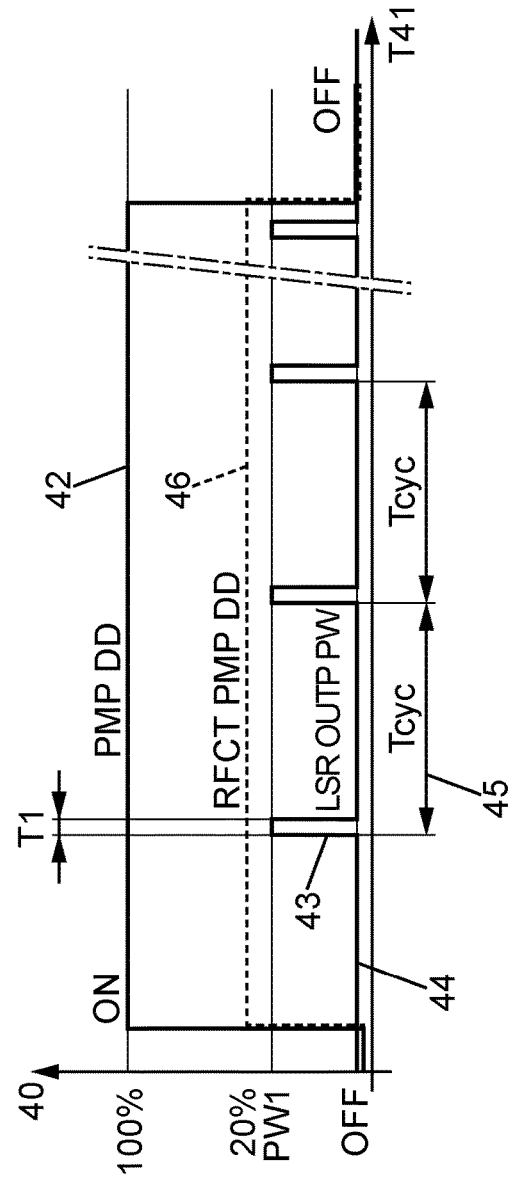
FIG. 4 is a schematic graphic of the emitted pumping power and the emitted laser power of the laser device of [FIG. 1] over time.

With reference now to FIG. 4, a schematic graph of power 40 over time 41 is represented for the different optical beams B22, B33 and B4 of the laser device of FIG. 1.

Namely, the power 44 of the laser beam B4 is represented at the output of the laser device, namely after the laser beam B4 having being amplified by the laser amplifier 9. The laser beam B4 is a power pulsed beam whose bursts 43 are periodically emitted according to a period Tcyc=1 µs.

Such a laser device is advantageously powerful and the energy of each burst may reach values over 1 µJ, for instance equal to 1 or 2 µJ. For instance, the time lapse T1 of the bursts is 1 ns and the peak PW1 of the power 44 is 2000 W. The laser chip 30 emits the bursts at the period Tcyc having the time lapse T1 and the laser amplifier 9 amplifies the power of the bursts until the peak PW1.

The power 44 of the laser beam B4 is generated thanks to a power 42 of the pump beam B1 emitted by the pumping diode 1.

The power 42 of the pump beam B22 is represented at the input of the laser chip 30 and the power 46 of the pump beam B33 is represented at the input of the laser amplifier 9. As represented, the ratio of the reflection of the pumping beam B22 on the reflective surface 32 is 20%.

When, the pumping diode 1 is turned on such that the pumping diode 1 emits a pump beam B1, the power 42 (and the power 46) are maximum and continuous and respectively feed the laser chip 30 and the laser amplifier 9.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

The invention claimed is:

1. A laser device for laser detection and ranging, comprising:
   a laser oscillator configured for emitting a pulsed laser beam when optically pumped at a pumping wavelength, the laser oscillator being configured for emitting the laser beam at a laser wavelength in a laser direction along a laser beam path,
   a laser beam amplifier disposed on the laser beam path and configured to amplify the laser beam when the laser beam amplifier is optically pumped at the pumping wavelength,
   a pumping unit disposed between the laser oscillator and the laser beam amplifier and configured to, when receiving an incoming continuous pumping beam having the pumping wavelength:
      transmit the laser beam along the laser direction;
      send the pumping beam for pumping the laser oscillator in the opposite direction to the laser direction, and
      transmit a part of the pumping beam which is reflected by the laser oscillator for pumping the laser beam amplifier, in the laser direction, such that the laser beam, the pumping beam and the part of the pumping beam which is reflected by the laser oscillator are collinear along the laser beam path.

2. A laser device according to claim 1, wherein the pumping unit is further configured in order that the pumping beam which is sent for pumping the laser oscillator is circularly polarized.

3. A laser device according to claim 1, wherein the incoming pumping beam has an incoming direction which is inclined at a predefined angle to the laser direction.

4. A laser device according to claim 3, wherein the incoming pumping beam has a first polarization state, wherein the pumping unit is further configured to:
   deviate in the opposite direction the incoming pumping beam, and
   transmit in the laser direction part of the pumping beam which is reflected by the laser oscillator with a second polarization state, the first and second polarization states being orthogonal to each other.

5. A laser device according to claim 4, wherein the first and second polarization states are linear, the pumping unit comprising:
   a polarizing beamsplitter configured to perform said deviation and transmission of the pumping beams,
   an optical component being disposed on the laser direction between the laser oscillator and the beamsplitter and being configured to, at the pumping wavelength, convert a linear polarization into a circular polarization in the opposite direction and to convert a perpendicular circular polarization into a perpendicular linear polarization in the laser direction.

6. A laser device according to claim 3, wherein the predefined angle is 90°.

7. A laser device according to claim 1, wherein the beamsplitter is a dielectric polarizing beamsplitter.

8. A laser device according to claim 1, wherein the laser oscillator is a solid state laser.

9. A laser device according to claim 1, wherein the laser oscillator comprises an oscillator material and a saturable absorber material.

10. A laser device according to claim 1, wherein the laser oscillator comprises an oscillator material and the laser beam amplifier comprises an amplifier material, the oscillator material and the amplifier material having the same chemical composition.

11. A laser device according to claim 1, wherein the pumping unit is a single pumping unit.

12. A laser device according to claim 1, wherein the laser oscillator comprises:
   an oscillator material, and
   two opposite parallel reflective surfaces on both sides,
   the laser oscillator being further configured for emitting the laser beam when the oscillator material is optically pumped at a pumping wavelength, the laser oscillator being configured for emitting the laser beam through one of the reflective surfaces, the laser direction being perpendicular to a normal of the reflective surfaces.

13. A laser device according to claim 12, wherein the oscillator material is a vanadate based host crystal.

14. A laser device according to claim 1, wherein the laser oscillator, the laser beam amplifier and the pumping unit of the laser device are optically connected in free space.

15. A laser device according to claim 1, wherein the laser wavelength is 1064 nm and the pumping wavelength is 808 nm.

16. A laser device according to claim 1, wherein the part of the pumping beam which is reflected is over 50%.

17. A laser device according to claim 1, wherein the optical component operates as a quarter waveplate for the pumping wavelength.

18. A laser device according to claim 1, wherein the optical component is a dual wavelength multi-order wave plate.

19. A laser device for laser detection and ranging, comprising:
   a laser oscillator configured for emitting a pulsed laser beam when optically pumped at a pumping wavelength, the laser oscillator being configured for emitting the laser beam at a laser wavelength in a laser direction along a laser beam path,
   a laser beam amplifier disposed on the laser beam path and configured to amplify the laser beam when the laser beam amplifier is optically pumped at the pumping wavelength,
   a pumping unit disposed between the laser oscillator and the laser beam amplifier and configured to, when receiving an incoming continuous pumping beam having the pumping wavelength:
   transmit the laser beam along the laser direction;
   send the pumping beam for pumping the laser oscillator in the opposite direction to the laser direction, and
   transmit a part of the pumping beam which is reflected by the laser oscillator for pumping the laser beam amplifier, in the laser direction, such that the laser beam, the pumping beam and the part of the pumping beam which is reflected by the laser oscillator are collinear along the laser beam path, wherein the pumping unit is further configured in order that the pumping beam which is sent for pumping the laser oscillator is circularly polarized.

20. A vehicle comprising a laser device according to claim 1.

* * * * *